US 8,754,977 B2

(12) United States Patent
Voss et al.

(10) Patent No.: US 8,754,977 B2
(45) Date of Patent: Jun. 17, 2014

(54) SECOND CAMERA FOR FINDING FOCAL TARGET IN POORLY EXPOSED REGION OF FRAME TAKEN BY FIRST CAMERA

(75) Inventors: Shane D Voss, Fort Collins, CO (US); Jason Yost, Windsor, CO (US); Tanvir Islam, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 13/192,820

(22) Filed: Jul. 28, 2011

(65) Prior Publication Data

US 2013/0027606 A1 Jan. 31, 2013

(51) Int. Cl.
*H04N 5/232* (2006.01)
*H04N 5/235* (2006.01)
*G03B 13/00* (2006.01)

(52) U.S. Cl.
USPC .................................... 348/350; 348/230.1

(58) Field of Classification Search
USPC ........ 348/207.1, 216.1, 229.1, 230.1, 333.02, 348/333.03, 333.12, 345, 350, 362, 364
See application file for complete search history.

(56) References Cited

U.S. PATENT DOCUMENTS

| | | | |
|---|---|---|---|
| 6,628,334 B1 * | 9/2003 | Gaylord | 348/364 |
| 7,580,076 B2 * | 8/2009 | Battles et al. | 348/362 |
| 7,702,230 B2 | 4/2010 | Kijima | |
| 7,729,602 B2 * | 6/2010 | Janson et al. | 348/262 |
| 7,796,870 B2 | 9/2010 | Wang | |
| 8,243,191 B2 * | 8/2012 | Uchida | 348/353 |
| 8,310,572 B2 * | 11/2012 | Watanabe | 348/255 |
| 8,441,520 B2 * | 5/2013 | Dahi et al. | 348/47 |
| 8,446,481 B1 * | 5/2013 | Geiss | 348/229.1 |
| 2006/0187315 A1 * | 8/2006 | Yokonuma | 348/229.1 |
| 2007/0024721 A1 * | 2/2007 | Rogers | 348/229.1 |
| 2007/0188650 A1 * | 8/2007 | Kobayashi et al. | 348/350 |
| 2008/0024614 A1 * | 1/2008 | Li et al. | 348/207.99 |
| 2008/0055412 A1 | 3/2008 | Tanaka | |
| 2008/0055426 A1 * | 3/2008 | Pertsel et al. | 348/229.1 |
| 2008/0158410 A1 * | 7/2008 | Lin | 348/364 |
| 2012/0105672 A1 * | 5/2012 | Doepke et al. | 348/229.1 |
| 2013/0057729 A1 * | 3/2013 | Ajito | 348/234 |
| 2013/0242059 A1 * | 9/2013 | Dahi et al. | 348/47 |

FOREIGN PATENT DOCUMENTS

| | | | | |
|---|---|---|---|---|
| JP | 2006127489 A | * | 5/2006 | |
| JP | 2006197236 A | * | 7/2006 | |
| JP | 2008147777 A | | 6/2008 | |
| KR | 20080007719 A | | 1/2008 | |
| TW | 201108155 A | * | 3/2011 | |

* cited by examiner

*Primary Examiner* — John Villecco
(74) *Attorney, Agent, or Firm* — Robert McDowell

(57) ABSTRACT

Embodiments provide methods, apparatuses, and articles of manufacture for generating frames and changing lens positions based on the analysis of the frames. In one example, a controller coupled to a first camera and a second camera is to change a lens position of the first camera for a second frame based on the identification of a focal target in a frame generated by the second camera.

19 Claims, 5 Drawing Sheets

SECOND CAMERA FOR FINDING FOCAL TARGET IN POORLY EXPOSED REGION OF FRAME TAKEN BY FIRST CAMERA

BACKGROUND

Imaging devices, such as cameras and video recorders, among others, are capable of various exposure settings. An exposure setting may impact the camera's ability to focus on various targets. For example, an image including an over exposed or under exposed region may prevent the imaging device from determining whether the over exposed or under exposed region includes detail that may be used to adjust the focus of the imaging device.

DETAILED DESCRIPTION

In a well exposed frame there may be regions which are either over exposed or under exposed. These regions may or may not obscure items that can be used as focal targets. To determine if these poorly exposed regions of the well exposed frame include valid focal targets, the imaging device may generate a new frame with a different exposure. Once generated, the imaging device may determine whether focal targets are present. This determination, via the generation of another frame, is difficult to accomplish without disturbing various imaging device characteristics such as frame rates, media architecture, and video quality, which includes among other things video brightness and image noise.

In the present disclosure, methods, systems, apparatuses, and associated programming are disclosed that enable an imaging device having dual cameras to assess poorly exposed regions for focal targets without disturbing a frame rate, associated video quality, or media architecture of the imaging device. A poorly exposed region is defined as a region of a frame that is either over exposed or under exposed. Over exposed and under exposed regions are regions having an exposure that prevents the imaging device from distinguishing, identifying, and/or utilizing detail within that region as a focal target. A focal target is defined as any detail that may be utilized by the imaging device for the purpose of focusing. Whether a frame is over exposed, under exposed, or correctly exposed may be controlled by an exposure setting of the imaging device.

Figure 1:
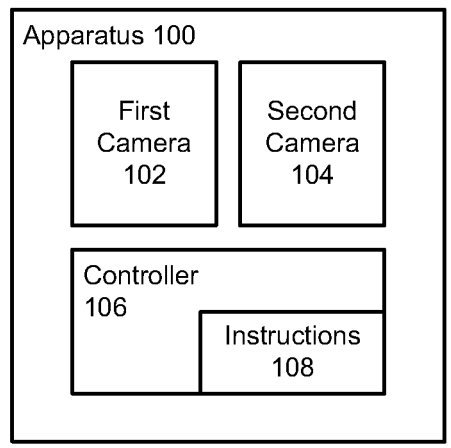
FIG. 1 is an illustration of an apparatus in accordance with an example of the present disclosure.

Referring to FIG. 1, an apparatus is illustrated in accordance with the present disclosure. The apparatus 100 includes a first camera 102, a second camera 104, and a controller 106 capable of executing instructions 108. The instructions may be computer-readable instructions tangibly embodied on a computer-readable medium, which when executed by a processor or controller, enable a device to perform various operations.

The apparatus 100 may be an imaging device such as, but not limited to, a camera, a video camera, a smart phone, a tablet computer, a slate computer, a mobile phone, or any other device capable of generating video and/or still frames.

A frame as discussed herein is defined as an image captured by an imaging device. Multiple frames may be iteratively output to form a video. Alternatively, a single frame may be output to form a still image, e.g., a picture. In forming a still image, an imaging device may output multiple frames to a display thereby enabling a user to determine when the still image should be generated. This may be referred to as a "live view" on various imaging devices.

The first camera 102 and the second camera 104 may be similar cameras disposed in different locations on apparatus 100. While disposed in different regions, the first camera 102 and the second camera 104 may capture images of the same scene from their respective locations on the apparatus. The captured images may then be correlated to one another. The first camera 102 and the second camera 104 may be capable of recording video and still images and may have similar or different components, for example, sensors. The first camera 102 and the second camera 104 may both be disposed in a forward-facing manner or a rear-facing manner with respect to a display or user interface (UI) of the imaging device.

The controller 106 is coupled to the first camera 102 and the second camera 104. The controller 106 may be an application specific integrated circuit (ASIC), a controller having a processor configured to process instructions, or a component including logic. The controller 106 may perform functions or processes other than those associated with this disclosure. Additionally, the controller 106 may include other components or be incorporated into other components without deviating from the scope of the disclosure.

In one example, the first camera 102 is to generate a first frame and a second frame. The two frames, when viewed together may create the perception of a video or live view. The second camera 104 is to generate an analysis frame. An analysis frame is defined as a frame generated for analysis purposes. The analysis frame may be discarded after use, or alternatively, stored within memory. The controller 106 is to change a lens position and/or an exposure setting of the first camera 102 between the first frame and the second frame based on whether a focal target is identified in the analysis frame.

For example, the controller 106 may focus the first camera 102 on an object and control its exposure based on that object. The exposure may result in a frame having a poorly exposed region. While generating the first frame with the first camera 102, the controller 106 may generate an analysis frame with the second camera 104. The analysis frame may have an exposure setting that is different than the first camera 102. The exposure setting of the second camera 104 may correctly expose the poorly exposed region of the first frame, thereby allowing the controller 106 to analyze whether any focal targets are present within the poorly exposed region of the first frame.

In generating the analysis frame, the controller 106 may adjust the exposure setting of the second camera 104 resulting in the analysis frame having other under exposed regions or over exposed regions. However, the adjusted exposure setting may enable the controller 106 to determine whether a focal target exists within the poorly exposed region of the first frame. Based on the existence of a focal target, the controller may adjust a lens of the first camera 102 for the second frame. In addition to adjusting the lens of the first camera 102 for the second frame, the controller 106 may also adjust the exposure settings of the first camera 102 to better capture the details of the focal target. In various examples, the exposure adjustment may be minimal. The minimal adjustment may lighten or darken the poorly exposed regions, and conversely lighten or darken the correctly exposed regions. The controller 106 may attempt to achieve a balance between the two regions, or alternatively, may attempt merely to correctly expose the poorly exposed region.

The adjustment of the lens and/or exposure settings of the first camera 102 for the second frame may occur without altering a desired frame rate of the first camera 102. The adjustment may be based on focal targets having a predetermined priority. For example, if a face is determined to be in the poorly exposed region, the controller 106 may determine that the correct focal target is the face and adjust the first camera 102 accordingly. Other focal targets may include objects, faces, smiles, and text, among others.

Figure 2:
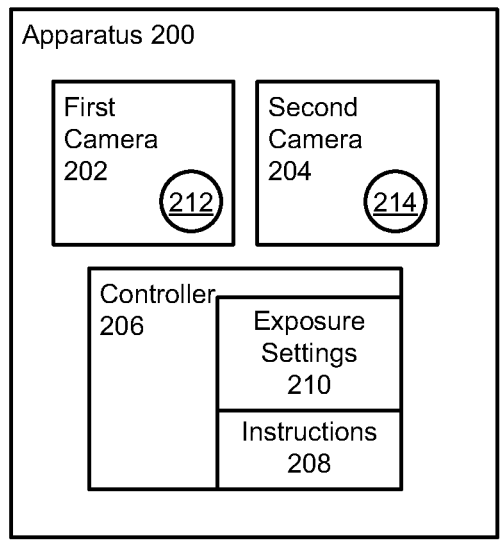
FIG. 2 is an illustration of an apparatus in accordance with an example of the present disclosure.

Referring to FIG. 2, an apparatus is illustrated in accordance with another example of the present disclosure. The apparatus includes a first camera 202 having a lens 212, a second camera 204 having a lens 214, and a controller 206. The controller 206 is to control exposure settings 210, among other settings, for the first camera 202 and the second camera 204. The controller 206 is further to execute instructions 208. Similar to FIG. 1, apparatus 200 may be an imaging device such as, but not limited to, a camera, a video camera, a smart phone, a tablet computer, a slate computer, a mobile phone, or any other device capable of generating video and/or still frames. The instructions may be computer-readable instructions tangibly embodied on a computer-readable medium, which when executed by a processor or controller, enable a device to perform various operations.

Lens 212 and lens 214 may be coupled, respectively, to the first camera 202 and the second camera 204. The lenses 212 and 214 may be configured to focus on various objects disposed at varying distances from the apparatus 200. The first camera 202 and the second camera 204 may operate in a similar manner to the first and second cameras of FIG. 1. Camera 202, having lens 212, and camera 204 having lens 214 may be similar or different. For example, camera 202 may incorporate a different or similar sensor in comparison to camera 204, and likewise, lens 212 may be different or similar to lens 214.

In one example, the controller 206 is to control the first camera to generate a first frame and a second frame. While generating the first frame with the first camera 202, the controller 206 may control the second camera 204 to generate an analysis frame. The controller 206 may then change a lens position of the lens 212 of the first camera 202 between the first frame and the second frame based on a focal target identified in the analysis frame. The analysis frame may suitably expose a region of the first frame that was poorly exposed in the first frame.

To suitably expose a region of the first frame that was poorly exposed, the second camera 204 may alter its exposure setting 210 such that it is different than the first camera 202. For example, if the exposure setting 210 of the first camera is such that the poorly exposed region is over exposed, thereby appearing predominately white in nature, the exposure setting 210 of the second camera may be set such that the analysis frame is under exposed, thereby bringing the poorly exposed region into a more accurate exposure.

In another example, the exposure setting 210 of the first camera may be such that the poorly exposed region is under exposed, thereby appearing predominately black or dark in nature. The exposure setting 210 of the second camera may be set such that the analysis frame is over exposed, thereby bringing the poorly exposed region into a more accurate exposure. In other words, the controller is to adjust an exposure setting 210 of the second camera 204 to enable the second camera 204 and the controller 206 to identify a focal target.

The controller 206 may execute the instructions 208 to adjust the various exposure settings 210 of the first camera 202 and the second camera 204. In adjusting the exposure setting of the second camera 204, the exposure setting 210 may be determined based on a setting that suitably exposes the poorly exposed region of the first frame generated by the first camera 202. The suitable exposure setting for this region may result in other poorly exposed regions in the analysis frame. However, this exposure setting may enable the controller 206 to determine whether an appropriate focal target exists in the poorly exposed region. Based on the existence of a focal target, the controller 206 may adjust the lens 212 and/or exposure setting of the first camera 202 for the second frame. The alteration between the first frame and the second frame may be such that a predetermined frame rate is not altered or delayed. That is, generating the first frame and altering the lens position of the first camera 202 for the second frame may include generating the first frame and the second frame at a predetermined frame rate.

The controller 206 may determine whether an analysis frame should be generated by the second camera 204 in multiple ways. In one example, the controller 206 may determine an analysis frame is to be generated based on a histogram of the first frame generated by the first camera 202. If the histogram includes an indication of either an over exposed region or an under exposed region, the controller 206 may generate an analysis frame with the second camera 204. Alternatively, the controller 206 may receive a command to generate an analysis frame. The command may be in the form of a signal generated in response to a user identifying a poorly exposed frame on a display. For example, a user may tap on a poorly exposed area of the first frame displayed on a touch-sensitive display. In response to the tap, the controller 206 may control the second camera 204 to generate the analysis frame. Other manners of detecting over exposed and under exposed regions are contemplated.

Figure 3:
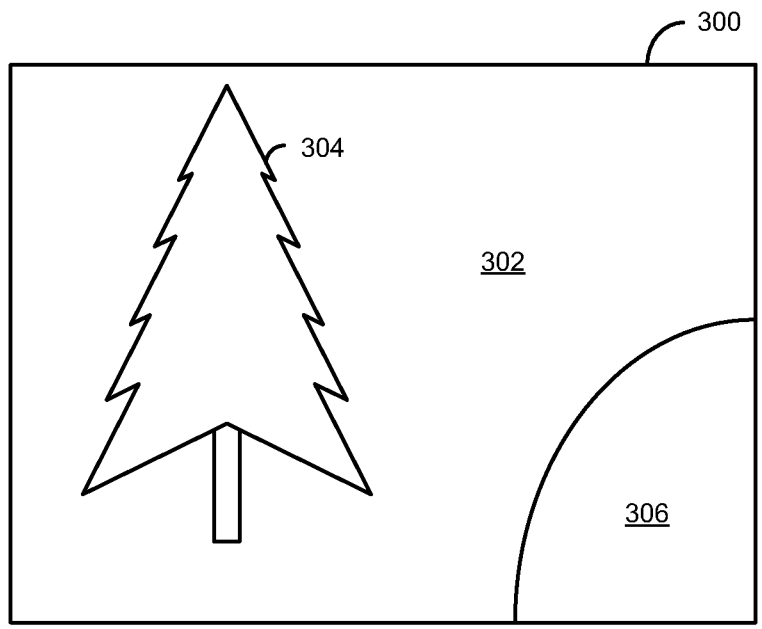
FIGS. 3-6 are example frames having various exposure settings in accordance with the present disclosure.
Figure 4:
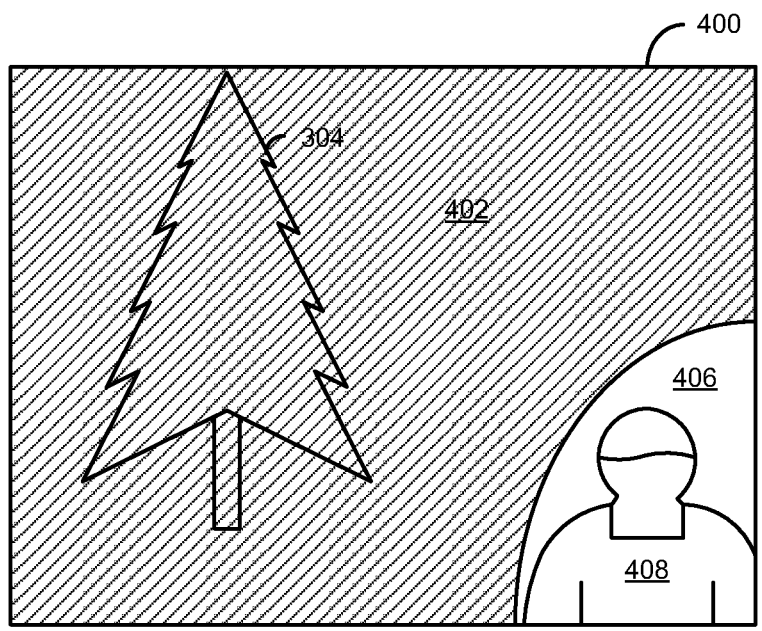
Figure 5:
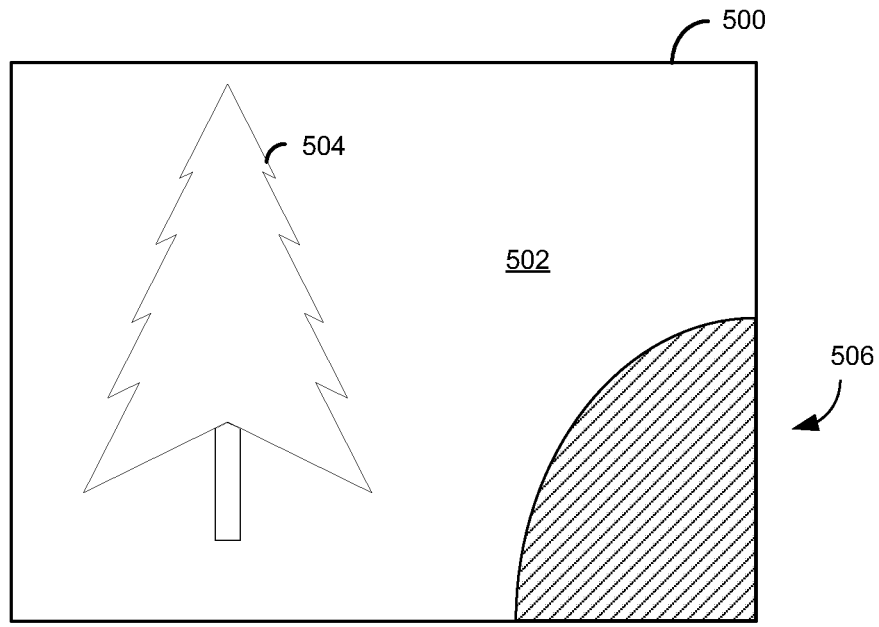
Figure 6:
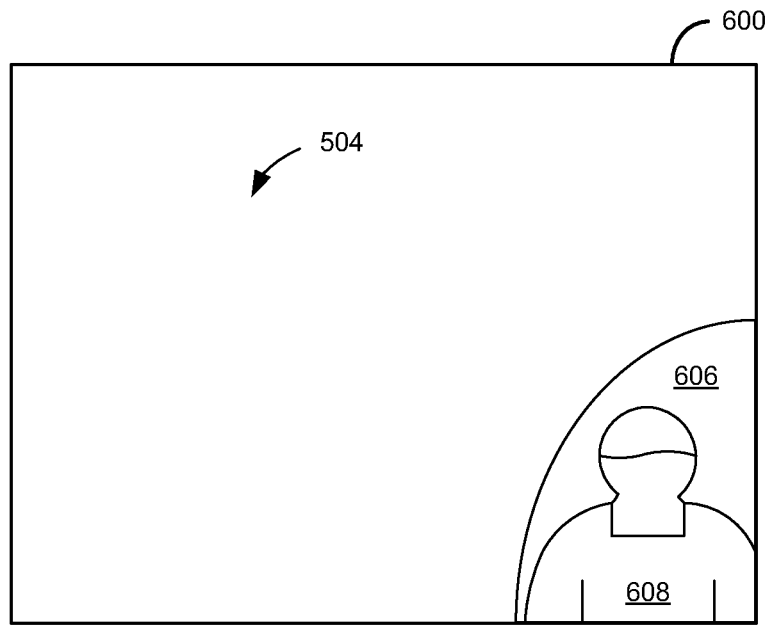

Referring to FIGS. 3-6, various example frames are illustrated. The example frames may have been generated by an apparatus as described with reference to FIG. 1 or 2. As illustrated, FIG. 3 illustrates a first frame generated by a first camera and FIG. 4 illustrates a second frame generated by a second camera. The first and second frames having different exposures of the same scene. Likewise, FIG. 5 illustrates a first frame generated by a first camera and FIG. 6 illustrates a second frame generated by a second camera. The first and second frames of FIGS. 5 and 6 having different exposures of the same scene.

Referring to FIGS. 3 and 4, a first frame 300 and an analysis frame 400 are illustrated, respectively. In FIG. 3, a frame 300 is illustrated having a focal target 304 in a region having a suitable exposure 302. A suitable exposure is an exposure that enables a camera to identify detail associated with the focal target 304. In other words, the suitable exposure associated with region 302 may vary so long as the focal target 304 may be identified. Given this exposure setting, the first frame may include a poorly exposed region, region 306. The poorly exposed region 306, as illustrated is over exposed. An over exposed region may result in the appearance of a merely white region. While delineated with a line separating the two regions 302 and 306, no such line generally exists; rather, there may be a gradual change in exposure.

In response to receipt of frame 300, or in other examples a user command, a controller may control a second camera to generate a second frame or an analysis frame such as the analysis frame 400 of FIG. 4. The controller may alter an exposure setting of the second camera such that it may analyze whether a focal target exists in the poorly exposed region 306 of frame 300. In altering the exposure setting, the analysis frame may be predominantly under exposed as indicated by the cross-hatched lines in region 402. The under exposed region may or may not reveal detail associated with the previous focal target 304. However, the previously over exposed region 306 may now be suitably exposed such that the controller may determine whether a focal target exists. In FIG. 4, the suitably exposed region 406 includes a focal target 408, namely a person. Consequently, in response to a determination that the focal target exits, the controller may alter a lens position and/or an exposure of the first camera and generate a second frame. This alteration of the first camera may result in a second frame focusing on the target 408, which may occur without deviating from a predetermined frame rate.

Referring to FIGS. 5 and 6 a first frame 500 and an analysis frame 600 are illustrated, respectively. In FIG. 5, a frame 500 is illustrated having a focal target 504 in a region having a suitable exposure 502. The region 502 may have an exposure that enables a camera to determine detail associated with the focal target 504. In other words, the exposure associated with region 502 may vary so long as the focal target 504 may be identified. Given this exposure setting, the first frame 500 may include a poorly exposed region, region 506. The poorly exposed region 506, as illustrated is under exposed. An under exposed region may result in the appearance of a merely black or dark region. While delineated with a line separating the two regions 502 and 506, no such line generally exists; rather, there may be a gradual change in exposure.

In response to receipt of frame 500, the controller may control a second camera to generate a second frame or an analysis frame 600, as illustrated in FIG. 6. The controller may alter an exposure setting of the second camera such that it may analyze whether a focal target exists in the poorly exposed region 506 of frame 500. In altering the exposure setting, the frame 600 may be predominantly over exposed. Such an over exposure may result in loss of detail of the original focal target 504. In some examples, however, the over exposed region may or may not lose detail associated with the focal target 504. In FIG. 6, the suitably exposed region 606 includes a focal target 608, namely a person. Consequently, in response to a determination that the focal target exits, the controller may alter a lens position and/or an exposure setting of the first camera and generate a second frame. This alteration of the first camera may result in a second frame focusing on the target 608. The second frame may be generated within a time period determined by a frame rate.

Figure 7:
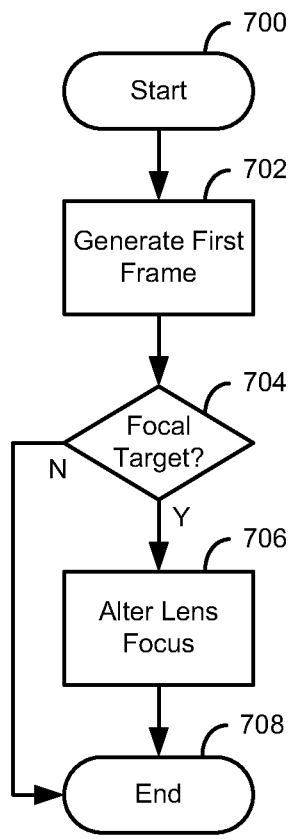
FIGS. 7-8 are example flow diagrams illustrating processes in accordance with the present disclosure.
Figure 8:
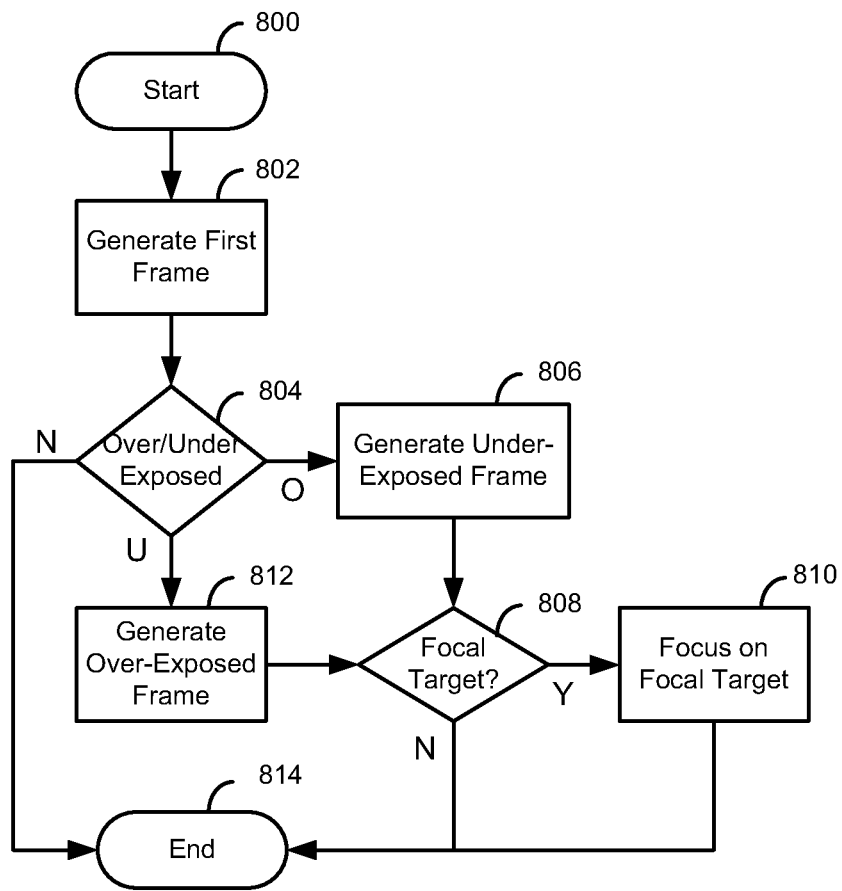

Referring to FIGS. 7 and 8, flow diagrams are illustrated in accordance with various examples of the present disclosures. The flow diagrams may depict processes that may be executed by devices, for examples those depicted in FIGS. 1 and 2. The flow diagrams may also illustrate instructions which may be embodied on a computer readable medium and which may be executable by a processor or controller to enable a device to perform the various operations. While illustrated in order, it should be understood that the various processes are not order dependent unless explicitly stated.

Referring now to FIG. 7, a process is illustrated in accordance with an example of the present disclosure. The method may begin at 700 and progress to 702 wherein an imaging device may generate a first frame with a first camera. The first camera may utilize an exposure setting that results in a poorly exposed region. The poorly exposed region may be over exposed or under exposed such that any detail within the region is unidentifiable by the imaging device.

At 704, the imaging device may determine by a second camera whether the poorly exposed region includes a focal target. The determination of whether the poorly exposed region includes a focal target may occur simultaneously or sequentially with the generation of the first frame. If a focal target is determined to be within the poorly exposed region, the method may continue to 706, where the controller of the imaging device may alter a lens focus position and/or an exposure setting of the first camera for a second frame. The lens alteration may be based on the determination that the poorly exposed region includes the focal target. After the alteration, the method may end at 708.

Returning to 704, if a focal target is not identified in the poorly exposed region of the first frame, the imaging device may generate another frame without altering the lens position of the first camera. The method may then end at 708. In various examples, ending may include the continued monitoring of frames generated subsequent to the first and second frames.

Referring to FIG. 8, another example of a flow diagram is illustrated in accordance with the present disclosure. The method may begin at 800 and progress to 802 where an imaging device may generate a first frame with a first camera. The first camera may have an exposure setting that results in a poorly exposed region in the first frame.

At 804, the imaging device may determine whether the poorly exposed region in the first frame is over exposed or under exposed. The determination may be based on an analysis of a data associated with the first frame, for example a histogram, or alternatively, may be determined in response to input from a user.

If it is determined that the poorly exposed region in the first frame is over exposed, the process may continue to 806 where the imaging device may generate an under exposed frame with the second camera. The under exposed frame may enable the imaging device, via a controller, to analyze the poorly exposed region of the first frame for focal targets at 808. If a focal target is identified at 808, the imaging device may alter the focus of the lens and/or an exposure of the first camera to focus on the focal target identified in the under exposed frame at 810. Once adjusted, the imaging device may generate a second frame via the first camera, the second frame compensating for the first frame. The method may then end at 814.

Returning to 808, if no focal target is found in the under exposed frame, the camera may generate the second frame from the first camera without altering the focus of the first camera's lens and/or exposure. The method may then end at 814.

Returning to 804, if a determination is made that the poorly exposed region is under exposed, the method may continue to 812. At 812, the imaging device may generate an over exposed frame with the second camera. The over exposed frame may enable the imaging device, via a controller for example, to analyze the poorly exposed region of the first frame for focal targets at 808. If a focal target is identified at 808, the imaging device may alter the focus of the lens and/or an exposure setting of the first camera to focus on the focal target at 810. Once focused, the imaging device may generate a second frame via the first camera. The method may end at 814.

Returning to 808, if no focal target is found in the under exposed frame, the camera may generate the second frame from the first camera without altering the focus and/or an exposure setting of the first. The method may then end at 814.

Returning, again, to 804, if the first frame generated by the first camera does not include a poorly exposed region, for example, neither an over exposed region or an under exposed region, the method may continue to 814 and end. Ending in various embodiments may include the generation and analysis of additional frames via the first camera the second camera.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A method, comprising:
    generating a first frame with a first camera, wherein the first camera has an exposure setting that results in a poorly exposed region in the first frame;
    determining by a second camera whether the poorly exposed region includes a focal target; and
    altering a lens focus position of the first camera for a second frame based on a determination that the poorly exposed region includes the focal target.

2. The method of claim 1, wherein determining whether the poorly exposed region includes the focal target comprises generating an under exposed frame with the second camera.

3. The method of claim 1, wherein determining whether the poorly exposed region includes the focal target comprises generating an over exposed frame with the second camera.

4. The method of claim 1, wherein generating the first frame comprises generating a video frame with the first camera.

5. The method of claim 1, wherein altering the lens focus position includes focusing the first camera on the focal target identified by the second camera.

6. The method of claim 1, further comprising:
    determining by the second camera whether an over exposed region in the first frame includes another focal target; and
    altering the lens focus position of the first camera for a third frame based on a determination that the over exposed region includes the another focal target.

7. The method of claim 1, wherein generating the first frame and altering the lens focus position of the first camera for the second frame comprises generating the first frame and the second frame at a predetermined frame rate.

8. An apparatus, comprising:
    a first camera to generate a first frame and a second frame;
    a second camera to generate an analysis frame; and
    a controller coupled to the first camera and the second camera, wherein the controller is to,
        determine a lens focus position based on the focal target identified in the analysis frame and a focal target in the first frame, and
        change a lens position of the first camera for the second frame based on a focal target identified in the analysis frame.

9. The apparatus of claim 8, wherein the second camera includes an exposure setting that is different than an exposure setting of the first camera.

10. The apparatus of claim 8, wherein the first camera has an exposure setting that generates an over exposed region in the first frame.

11. The apparatus of claim 8, wherein the first camera has an exposure setting that generates an under exposed region in the first frame.

12. The apparatus of claim 8, wherein the controller is further to control the first camera to generate the first frame and the second frame at a predetermined frame rate.

13. An apparatus comprising:
    a first camera to generate a first frame and a second frame;
    a second camera to generate an analysis frame; and
    a controller coupled to the first camera and the second camera, wherein the controller is to,
        adjust an exposure setting of the second camera to identify a focal target in the analysis frame, and
        change a lens position of the first camera for the second frame based on the focal target identified in the analysis frame.

14. An apparatus comprising:
    a first camera to generate a first frame and a second frame;
    a second camera to generate an analysis frame; and
    a controller coupled to the first camera and the second camera, wherein the controller is to,
        adjust an exposure setting of the second camera to generate the analysis frame, wherein the analysis frame is under exposed, and
        change a lens position of the first camera for the second frame based on the focal target identified in the analysis frame.

15. An article of manufacture including a plurality of programming instructions embodied on non-transitory computer readable media, which if executed by a processor, cause a computing device to:
    generate a frame of a scene with a first camera, wherein a portion of the scene is poorly exposed in the frame;
    analyze the portion of the scene that is poorly exposed in the frame with a second camera to identify a focal target; and
    alter a lens position of the first camera for another frame based on the focal target.

16. The article of manufacture of claim 15, wherein the plurality of programming instructions, if executed, further cause the computing device to:
    adjust an exposure setting of the second camera to analyze the portion of the scene that is poorly exposed in the frame.

17. The article of manufacture of claim 15, wherein the plurality of programming instructions, if executed, cause the computing device to:
    generate an analysis frame of the scene with the second camera, wherein the analysis frame is analyzed to identify the focal target.

18. The article of manufacture of claim 15, wherein the plurality of programming instructions, if executed, cause the computing device to:
    determine the lens position for the another frame based on the identified focal target and a focal target identified in the first frame.

19. The article of manufacture of claim 15, wherein the plurality of programming instructions, if executed, cause the computing device to:
    generate another frame of a scene with the first camera, wherein a portion of the another scene is over exposed in the frame; and
    analyze the portion of the another scene that is over exposed in the frame with a second camera to identify another focal target.

* * * * *